US 12,547,133 B2

(12) United States Patent
Uezu (10) Patent No.: US 12,547,133 B2
(45) Date of Patent: Feb. 10, 2026

(54) PROCESSING SYSTEM, AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Yoshimi Uezu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 597 days.

(21) Appl. No.: 17/871,981

(22) Filed: Jul. 24, 2022

(65) Prior Publication Data

US 2023/0305503 A1  Sep. 28, 2023

(30) Foreign Application Priority Data

Mar. 28, 2022  (JP) ................. 2022-052529

(51) Int. Cl.
*G06F 3/12* (2006.01)
*G05B 15/02* (2006.01)
*H04N 1/00* (2006.01)

(52) U.S. Cl.
CPC .............. *G05B 15/02* (2013.01); *G06F 3/12* (2013.01); *G06F 3/1205* (2013.01); *H04N 1/00976* (2013.01)

(58) Field of Classification Search
CPC ......... G05B 15/02; G06F 3/12; G06F 3/1205; H04N 1/00976
See application file for complete search history.

(56) References Cited

U.S. PATENT DOCUMENTS

| | | | |
|---|---|---|---|
| 2006/0092452 A1* | 5/2006 | Simpson | G06F 3/1288 358/1.14 |
| 2014/0185096 A1* | 7/2014 | Tokunaga | G03G 15/5075 358/1.15 |
| 2020/0204697 A1* | 6/2020 | Kim | G06F 3/1285 |

FOREIGN PATENT DOCUMENTS

| | | |
|---|---|---|
| JP | 2005324396 | 11/2005 |
| JP | 2016206295 | 12/2016 |

* cited by examiner

*Primary Examiner* — Michael W Choi
(74) *Attorney, Agent, or Firm* — JCIPRNET (57) ABSTRACT

An information processing apparatus includes a processor configured to perform a process including acquiring relevant information related to setting of a first device that needs to be changed depending on an environment from a device other than the first device, the first device not being capable of detecting predetermined device environment information, and controlling the first device by using the acquired relevant information.

19 Claims, 8 Drawing Sheets

INSTALLATION ENVIRONMENT INFORMATION

| INSTALLATION ENVIRONMENT | ENVIRONMENTAL CONDITION |
|---|---|
| HIGHLAND | SEA LEVEL am OR MORE<br>ATMOSPHERE PRESSURE LESS THAN bPa<br>HUMIDITY c% OR MORE |
| HIGH TEMPERATURE AND HIGH HUMIDITY | TEMPERATURE LESS THAN d DEGREES<br>HUMIDITY e% OR MORE |
| COLD REGION | TEMPERATURE LESS THAN f DEGREES |
| LARGE TEMPERATURE DIFFERENCE | TEMPERATURE g DEGREES OR MORE AND LESS THAN h DEGREES |
| . . . | . . . |

FIG. 10

PARAMETER INFORMATION

| INSTALLATION ENVIRONMENT | SETTING PARAMETER |
|---|---|
| NORMAL | LIGHT SOURCE WARM-UP PERIOD OF TIME: a MINUTES<br>FUSER WARM-UP PERIOD OF TIME: b MINUTES<br>ROLLER PRESSURE DURING PAPER CONVEYING: cPa<br>OPERATION PANEL ILLUMINANCE: dlx<br>... |
| HIGHLAND | ROLLER PRESSURE DURING PAPER CONVEYING: c1Pa |
| HIGH TEMPERATURE AND HIGH HUMIDITY | LIGHT SOURCE WARM-UP PERIOD OF TIME: a1 MINUTES<br>FUSER WARM-UP PERIOD OF TIME: b1 MINUTES |
| COLD REGION (WARM-UP DRIVING) | LIGHT SOURCE WARM-UP PERIOD OF TIME: a2 MINUTES<br>FUSER WARM-UP PERIOD OF TIME: b2 MINUTES<br>OPERATION PANEL ILLUMINANCE: d1lx |
| LARGE TEMPERATURE DIFFERENCE | FROM 7:00 TO 9:59: NORMAL<br>FROM 10:00 TO 17:59: HIGH TEMPERATURE AND HIGH HUMIDITY ENVIRONMENT<br>FROM 18:00 TO 6:59: LOW TEMPERATURE ENVIRONMENT |

FIG. 11

| IMAGE FORMING DEVICE INFORMATION | IMAGE FORMING DEVICE | INSTALLATION ENVIRONMENT |
|---|---|---|
| WITH DEVICE ENVIRONMENT SENSOR (SECOND IMAGE FORMING DEVICE) | IMAGE FORMING DEVICE (A) | HIGHLAND |
| | IMAGE FORMING DEVICE (B) | LARGE TEMPERATURE DIFFERENCE |

| IMAGE FORMING DEVICE INFORMATION | IMAGE FORMING DEVICE | INSTALLATION ENVIRONMENT |
|---|---|---|
| WITHOUT DEVICE ENVIRONMENT SENSOR OR LESS SENSOR (FIRST IMAGE FORMING DEVICE) | IMAGE FORMING DEVICE (a) | HIGHLAND |
| | IMAGE FORMING DEVICE (b) | LARGE TEMPERATURE DIFFERENCE |

FIG. 14

PROCESSING SYSTEM, AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2022-052529 filed Mar. 28, 2022.

BACKGROUND

(i) Technical Field

The present invention relates to an information processing apparatus, an information processing system, and a non-transitory computer readable medium storing an information processing program.

(ii) Related Art

JP2005-324396A proposes an environment detection system of an image forming device that includes a control circuit connected to an external temperature sensor and an external humidity sensor and changing information related to image formation in an image forming operation of a printer based on a detection content of the temperature sensor and the humidity sensor.

JP2016-206295A proposes an image forming device that includes a photoconductor, an exposure device that exposes the photoconductor to form a latent image, a developing device that develops the latent image by causing toner to adhere to the latent image, and a control unit that controls the image forming by the photoconductor and the developing device. The control unit includes a weather information acquisition unit that acquires weather information of temperature and humidity at a current point in time from weather forecasting of a region in which the image forming device is installed, a process control unit that performs correction control of process control based on the weather information at the current point in time, and a toner control unit that performs correction control of toner control based on the weather information at the current point in time.

SUMMARY

In a case where devices such as image forming devices are controlled by using external sensors or external information such as weather forecasting, a configuration for controlling the image forming devices by using external information is required for each device.

Aspects of non-limiting embodiments of the present disclosure relate to an information processing apparatus, an information processing system, and a non-transitory computer readable medium storing an information processing program that are capable of performing control appropriate for an environment even in a device not having a configuration for performing control by using information acquired from an outside.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus includes a processor configured to perform a process including acquiring relevant information related to setting of a first device that needs to be changed depending on an environment from a device other than the first device, the first device not being capable of detecting predetermined device environment information, and controlling the first device by using the acquired relevant information.

BRIEF DESCRIPTION OF THE DRAWINGS

Exemplary embodiment(s) of the present invention will be described in detail based on the following figures, wherein:

FIG. 2 is a block diagram showing a configuration of a part of an electrical system of a plurality of image forming devices installed in an office and the like;

DETAILED DESCRIPTION

Figure 1:
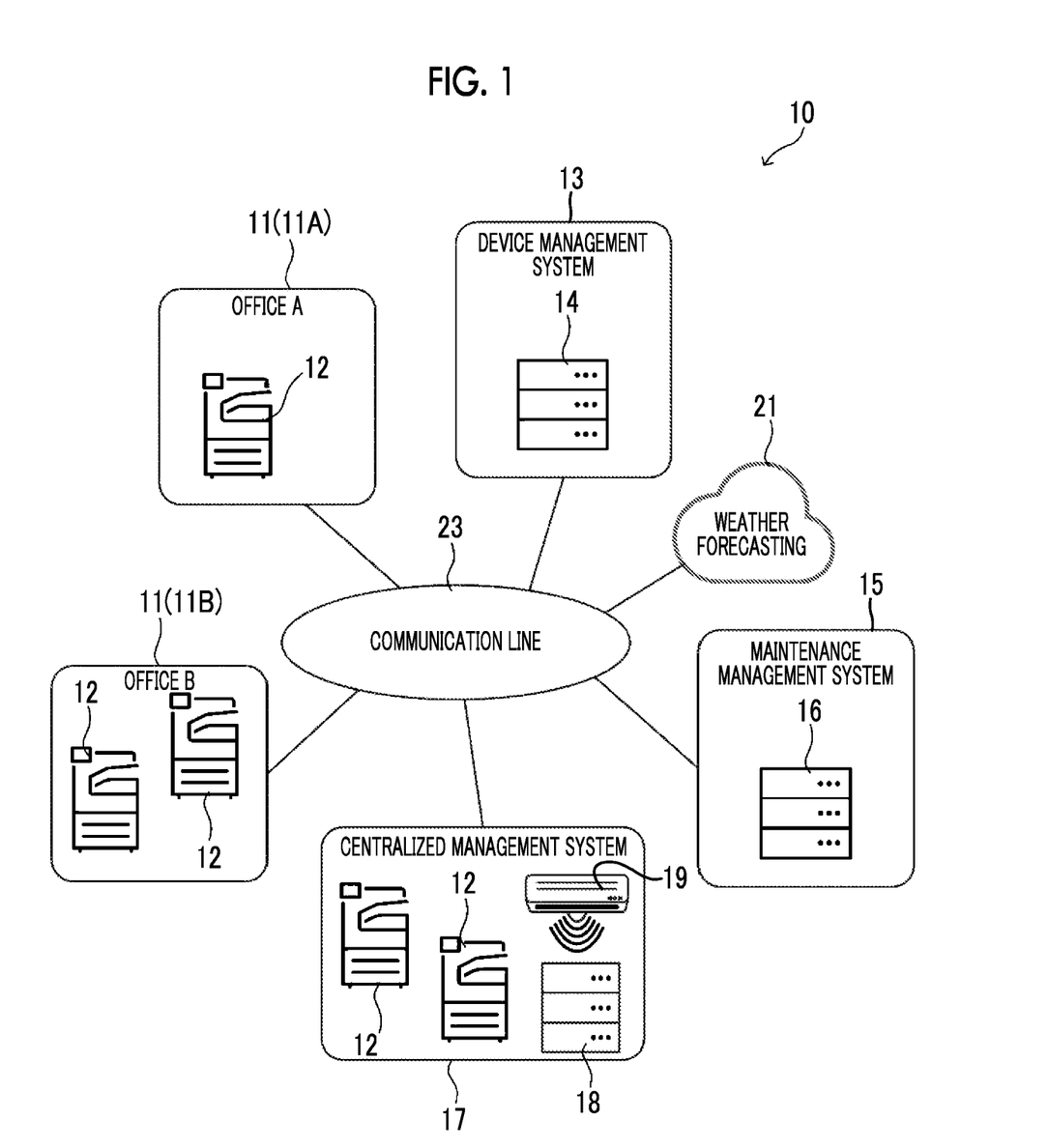
FIG. 1 is a diagram showing a schematic configuration of an information processing system according to the present exemplary embodiment.

Hereinafter, an example of an exemplary embodiment of the present invention will be described in detail with reference to the drawings. FIG. 1 is a diagram showing a schematic configuration of an information processing system according to the present exemplary embodiment.

An information processing system 10 according to the present exemplary embodiment includes a plurality of image forming devices 12, a device management server 14 of a device management system 13, a maintenance management server 16 of a maintenance management system 15, a centralized management server 18 of a centralized management system 17, and a weather forecasting service 21. The plurality of image forming devices 12, the device management server 14, the maintenance management server 16, the centralized management server 18, and the weather forecasting service 21 are connected via a communication line 23 such as a wide area network (WAN) and the Internet. It is possible to mutually transmit and receive various kinds of data via the communication line 23. The device management server 14 corresponds to an example of an information processing apparatus.

The image forming devices 12 are installed in an office A11A, an office B11B, the centralized management system 17, and the like. An image forming device having a plurality of functions such as a facsimile function, an image reading function, an image forming function, a copying function, a storage function of storing image information and the like, and a transmission function of transmitting image information and the like is applied as an example of the image forming device 12. Hereinafter, in a case where the office A11A and the office B11B are not distinguished, these offices will be described as office 11.

The device management server 14 constituting the device management system 13 monitors the plurality of image forming devices 12 installed in a pre-registered office 11 and the like, and performs control for suppressing the occurrence of a defect or the like. For example, processing such as changing the setting of the image forming device 12 of which setting is required to be changed due to a change in an environment is performed.

The maintenance management server 16 constituting the maintenance management system 15 manages maintenance information and the like representing maintenance contents in a case where a maintenance inspector performs maintenance of the image forming device 12.

The centralized management server 18 constituting the centralized management system 17 centrally manages an output infrastructure of the office 11 that has been operated individually, and provides a service for managing costs and processes related to a life cycle (selection, operation, and disposal, of a device or the like). In the present exemplary embodiment, the centralized management server 18 can also control an air conditioner 19 that air-conditions a space in which the image forming device 12 is installed.

The weather forecasting service 21 provides weather information distributed by the Japan Meteorological Agency, weather forecast companies, and the like in various regions of the country with data in a predetermined format.

The information processing system 10 according to the present exemplary embodiment does not need to include all the maintenance management system 15, the centralized management system 17, and the weather forecasting service 21, and may include at least one thereof.

Figure 2:
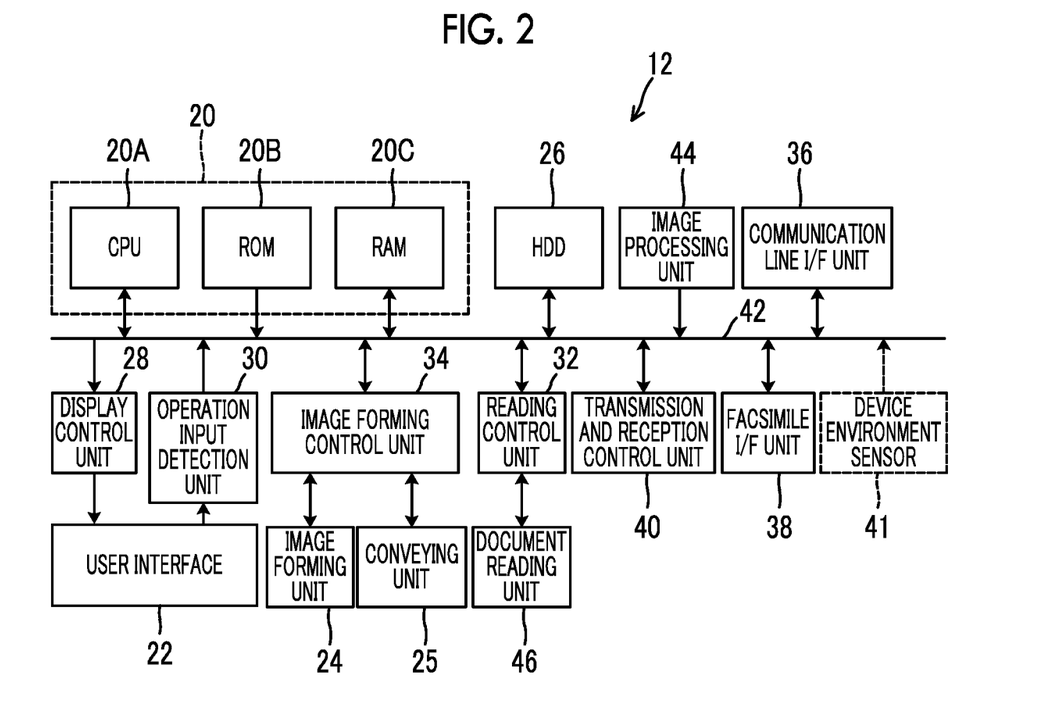

FIG. 2 is a block diagram showing a configuration of a part of an electrical system of the plurality of image forming devices 12 installed in the office 11 and the like.

As shown in FIG. 2, the image forming device 12 includes a control unit 20 including a central processing unit (CPU) 20A, a read only memory (ROM) 20B, and a random access memory (RAM) 20C. The CPU 20A controls the overall operation of the image forming device 12. The RAM 20C is used as a work area or the like when various programs are executed by the CPU 20A. Various control programs, various parameters, and the like are stored in advance in the ROM 20B. In the image forming device 12, each part of the control unit 20 is electrically connected by a system bus 42.

The image forming device 12 includes a hard disk drive (HDD) 26 for storing various kinds of data, application programs, and the like. The image forming device 12 includes a display control unit 28 that is connected to a user interface 22 and controls the display of various operation screens and the like on a display of the user interface 22. The image forming device 12 includes an operation input detection unit 30 that is connected to the user interface 22 and detects an operation instruction input via the user interface 22. In the image forming device 12, the HDD 26, the display control unit 28, and the operation input detection unit 30 are electrically connected to the system bus 42. Although the image forming device 12 according to the present exemplary embodiment describes the example in which the HDD 26 is provided, the present invention is not limited thereto, and a non-volatile storage unit such as a flash memory may be provided.

The image forming device 12 according to the present exemplary embodiment includes a reading control unit 32 that controls a reading operation of an optical image by a document reading unit 46 and a document feeding operation by a document conveying unit, and an image forming control unit 34 that controls image forming processing by an image forming unit 24 and conveying of paper to the image forming unit 24 by a conveying unit 25. The image forming device 12 includes a communication line interface (I/F) unit 36 that is connected to the communication line 23 and transmits and receives communication data to and from other external apparatuses such as the device management server 14, the maintenance management server 16, and the centralized management server 18 connected to the communication line 23, and an image processing unit 44 that performs various kinds of image processing. The image forming device 12 includes a facsimile interface (I/F) unit 38 connected to a telephone line (not shown) and transmits and receives facsimile data to and from a facsimile apparatus connected to the telephone line. The image forming device 12 includes a transmission and reception control unit 40 that controls transmission and reception of facsimile data via the facsimile I/F unit 38. In the image forming device 12, the transmission and reception control unit 40, the reading control unit 32, the image forming control unit 34, the communication line I/F unit 36, the facsimile I/F unit 38, and the image processing unit 44 are electrically connected to the system bus 42.

With the above configuration, the image forming device 12 according to the present exemplary embodiment executes accesses to the RAM 20C, the ROM 20B, and the HDD 26 by the CPU 20A. The image forming device 12 executes control of the display of information such as an operation screen and various messages on the display of the user interface 22 via the display control unit 28 by the CPU 20A. The image forming device 12 executes control of activations of the document reading unit 46 and the document conveying unit via the reading control unit 32 by the CPU 20A. The image forming device 12 executes control of activations of the image forming unit 24 and the conveying unit 25 via the image forming control unit 34 and controls the transmission and reception of communication data via the communication line I/F unit 36 by the CPU 20A. The image forming device 12 executes control of the transmission and reception of facsimile data via the facsimile I/F unit 38 by the transmission and reception control unit 40 by the CPU 20A. The image forming device 12 grasps operation contents in the user interface 22 based on operation information detected by the operation input detection unit 30 by the CPU 20A, and executes various kinds of controls based on the operation contents.

The plurality of image forming devices 12 include an image forming device 12 including a device environment sensor 41 that detects a device environment in the image forming device and an image forming device 12 not including the device environment sensor 41. That is, in a case where the device environment sensor 41 is provided, the device environment sensor 41 is electrically connected to the system bus 42 as shown by a dotted line in FIG. 2. The device environment sensor 41 detects device environment information indicating the device environment in the device such as temperature and humidity. The image forming device 12 including the device environment sensor 41 changes setting parameters of the image forming device by using the detection result of the device environment sensor 41. For example, the setting parameters that require temperature management in the device are changed according to the detected temperature. Hereinafter, the image forming device 12 that does not include the device environment sensor 41 and cannot detect the device environment information may be referred to as a first image forming device 12A, and the image forming device 12 that includes the device environment sensor 41 and can detect the device environment information may be referred to as a second image forming device 12B. Although the device environment sensor 41 is shown as one sensor in FIG. 2, the device environment sensor includes a plurality of sensors such as a temperature sensor and a humidity sensor.

Figure 3:
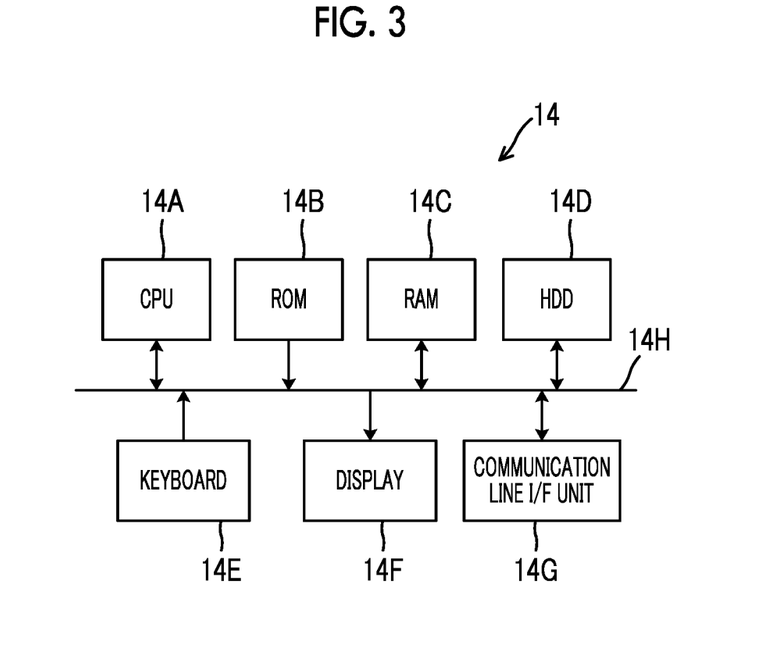
FIG. 3 is a block diagram showing a configuration of a part of an electrical system of a device management server according to the present exemplary embodiment.

Next, a configuration of a part of an electrical system of the device management server 14 according to the present exemplary embodiment will be described. FIG. 3 is a block diagram showing the configuration of the part of the electrical system of the device management server 14 according to the present exemplary embodiment.

As shown in FIG. 3, the device management server 14 according to the present exemplary embodiment includes a CPU 14A, a ROM 14B, a RAM 14C, an HDD 14D, a keyboard 14E, a display 14F, and a communication line interface (I/F) unit 14G. The CPU 14A controls the overall operation of the device management server 14. The ROM 14B stores information programs for various kinds of control, various parameters, and the like in advance. The RAM 14C is used as a work area or the like when various programs by the CPU 14A are executed. The HDD 14D stores various kinds of data, application programs, and the like. The HDD 14D functions as a storage 14D that stores information in the device management server 14. The keyboard 14E is used to input various kinds of information. The display 14F is used to display various kinds of information. The communication line interface (I/F) unit 14G is connected to the communication line 23 and transmits and receives various kinds of data to and from other apparatuses connected to the communication line 23. Each part of the above device management server 14 is electrically connected by a system bus 14H. Although the device management server 14 according to the present exemplary embodiment describes the example in which the HDD 14D is provided, the present invention is not limited to thereto, and another non-volatile storage unit such as a flash memory may be provided.

With the above configuration, the device management server 14 according to the present exemplary embodiment executes accesses to the ROM 14B, the RAM 14C, and the HDD 14D, acquisition of various kinds of data via the keyboard 14E, and display of various kinds of information on the display 14F by the CPU 14A. The device management server 14 executes control of the transmission and reception of communication data via the communication line I/F unit 14G by the CPU 14A.

Since the centralized management server 18 and the maintenance management server 16 basically have a general computer configuration similar to the configuration of the device management server 14, the detailed description thereof will be omitted.

Figure 4:
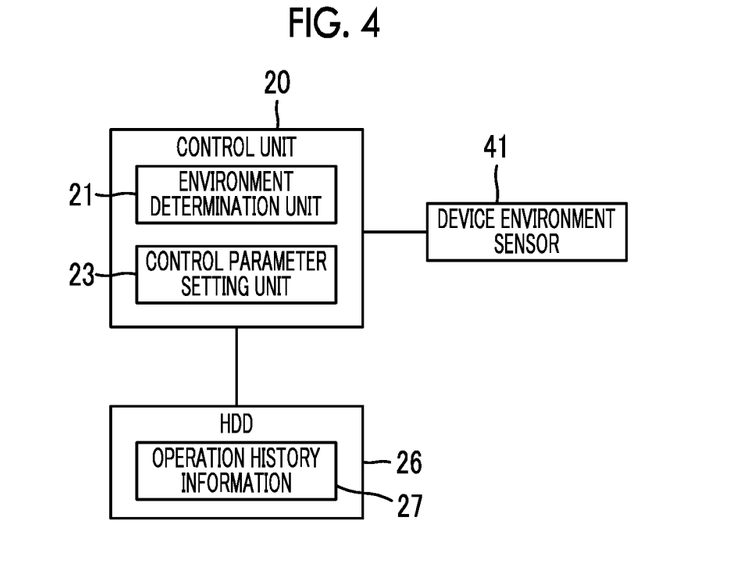
FIG. 4 is a functional block unit showing a functional configuration of a second image forming device.

Here, a functional configuration of the second image forming device 12B will be described. FIG. 4 is a functional block unit showing the functional configuration of the second image forming device 12B.

The second image forming device 12B has functions of an environment determination unit 21 and a control parameter setting unit 23 by the CPU 20A executing the program.

The environment determination unit 21 determines whether or not the setting needs to be changed based on the detection result of the device environment sensor 41. For example, the environment determination unit detects that there is a possibility that a dew condensation state or dew condensation occurs from the temperature and humidity detected by the device environment sensor 41.

The control parameter setting unit 23 sets control parameters based on the determination result of the environment determination unit 21. For example, in a case where the dew condensation state is detected, the setting parameter is changed to a predetermined warm-up driving parameter. In a case where the setting parameter is changed, the control parameter setting unit 23 transmits a changed content to the device management server 14 and transmits operation history information stored in the HDD 26 to the device management server 14.

As the operation history information stored in the HDD 26, operation history information such as the number of prints, a print type, a frequency, and power on and off is stored. In the present exemplary embodiment, the device management server 14 searches for an image forming device 12 that is similar to the device used by using the operation history information.

Figure 5:
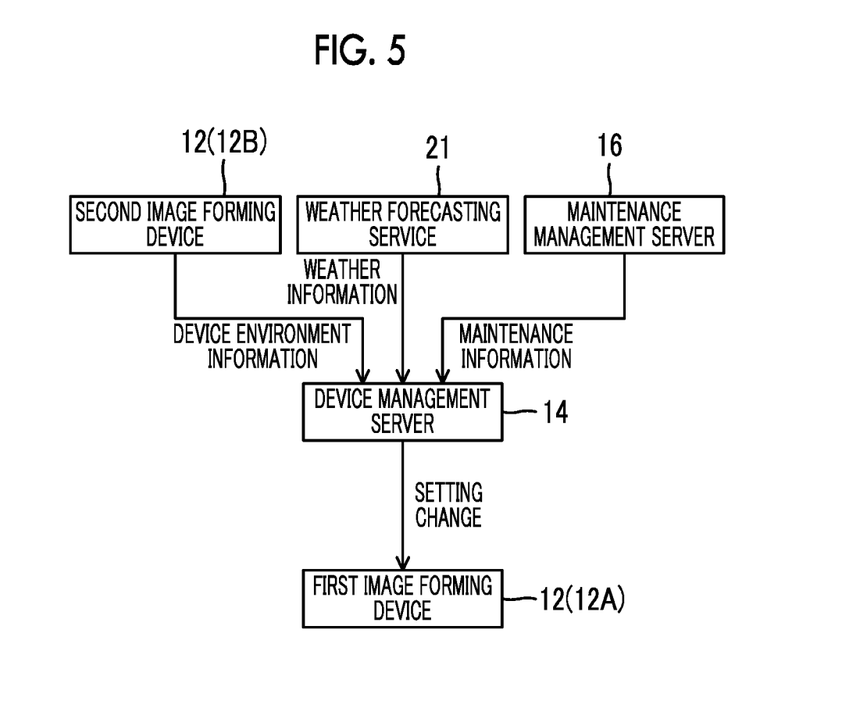
FIG. 5 is a block diagram illustrating an outline of a device management service provided by the device management server in the information processing system according to the present exemplary embodiment.

Next, an outline of a device management service provided by the device management server 14 in the information processing system 10 according to the present exemplary embodiment having the above-described configuration will be described. FIG. 5 is a block diagram illustrating an outline of the device management service provided by the device management server 14 in the information processing system 10 according to the present exemplary embodiment.

In the image forming device 12, in order to maintain image forming quality or in order to suppress a failure, it is necessary to control corresponding to the environment such as a temperature, humidity and dust, and a usage status of a multifunction machine depending on a region. For example, in a cold region, since there is a possibility of failure due to the occurrence of the dew condensation, dew condensation prevention settings are performed.

However, in the information processing system 10 according to the present exemplary embodiment, the first image forming device 12A not including the device environment sensor 41 cannot perform control corresponding to the environment and the region.

Thus, in the information processing system 10 according to the present exemplary embodiment, as shown in FIG. 5, the device management server 14 acquires relevant information related to the setting of the image forming device 12 needs to be changed depending on the environment from at least one of the second image forming device 12B, the weather forecasting service 21, or the maintenance management server. Specifically, the device management server 14 acquires at least one information of the device environment information detected by the second image forming device 12B that includes the device environment sensor 41 and can detect the device environment information, the weather information provided by the weather forecasting service 21, or the maintenance information managed by the maintenance management server 16.

The device management server 14 performs processing of controlling the first image forming device 12A not including the device environment sensor 41 by using the acquired relevant information as the device management service. As the processing of controlling the first image forming device 12A, for example, processing of controlling the first image forming device 12A to change the setting parameter and the like is performed. Alternatively, the first image forming device 12A may perform processing of controlling the air conditioner 19 or the like provided at a set location.

Subsequently, processing performed by the information processing system 10 according to the present exemplary embodiment having the above-described configuration will be described.

Figure 6:
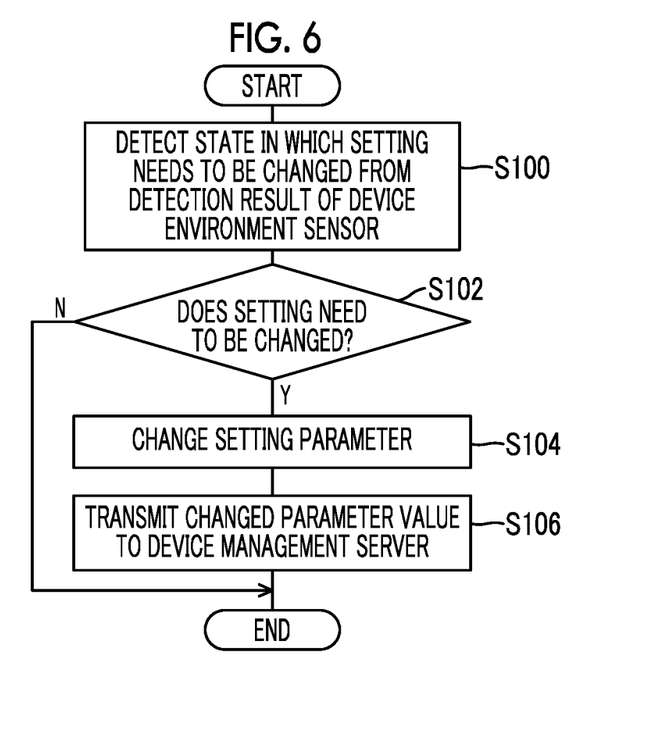
FIG. 6 is a flowchart showing an example of a flow of processing performed by the second image forming device of the information processing system according to the exemplary embodiment.

First, processing performed by the second image forming device 12B including the device environment sensor 41 will be described. FIG. 6 is a flowchart showing an example of a flow of the processing performed by the second image forming device 12B of the information processing system 10 according to the present exemplary embodiment. The processing of FIG. 6 may be started, for example, at a predetermined time or may be started at each predetermined fixed period of time.

In step S100, the CPU 20A detects a state in which the setting needs to be changed from the detection result of the device environment sensor 41, and proceeds to step S102.

In step S102, the CPU 20A determines whether or not the setting needs to be changed. In a case where the determination is negative, the series of processing is ended as it is, and in a case where the determination is positive, the CPU proceeds to step S104.

In step S104, the CPU 20A changes the setting parameter based on the detection result of the device environment sensor 41, and proceeds to step S106.

In step S106, the CPU 20A transmits the changed parameter value to the device management server 14 and ends the series of processing. In a case where the parameter value is transmitted to the device management server 14, the operation history information is also transmitted to the device management server 14.

Figure 7:
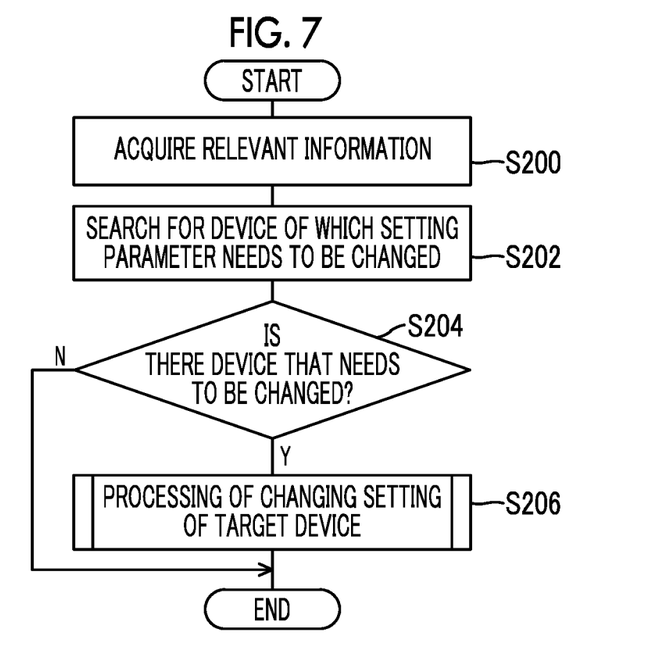
FIG. 7 is a flowchart showing an example of a flow of processing performed by the device management server of the information processing system according to the present exemplary embodiment.

Subsequently, processing performed by the device management server 14 will be described. FIG. 7 is a flowchart showing an example of a flow of the processing performed by the device management server 14 of the information processing system 10 according to the present exemplary embodiment. The processing of FIG. 7 may be started, for example, at a preset time or may be started at each predetermined fixed period of time.

In step S200, the CPU 14A acquires the relevant information, and proceeds to step S202. That is, at least one information of the device environment information detected by the second image forming device 12B that includes the device environment sensor 41 and can detect the device environment information, the weather information provided by the weather forecasting service 21, or the maintenance information managed by the maintenance management server 16 is acquired.

In step S202, the CPU 14A searches for a device of which a setting parameter needs to be changed, and proceeds to step S204. For example, the first image forming device 12A installed within a predetermined range from an installation location of the second image forming device 12B of which the setting parameter is changed due to a change in the environment may be searched for. Alternatively, the first image forming device 12A having an environment similar to an installation environment of the second image forming device 12B of which the setting parameter is changed may be searched for. Alternatively, the first image forming device 12A installed within a predetermined range from an installation location of the image forming device 12 for which maintenance for changing the setting parameter due to the change in the environment is performed may be searched for from the maintenance information. Alternatively, the first image forming device 12A installed in an environment similar to the image forming device 12 for which the maintenance for changing the setting parameter due to the change in the environment is performed may be searched for from the maintenance information. Alternatively, the first image forming device 12A which may be under a predetermined environment such as dew condensation may be searched for from the weather information.

In step S204, the CPU 14A determines whether or not there is a first image forming device 12A that needs to be changed. The determination is performed based on the search result of step S202, and in a case where the determination is negative, the series of processing is ended as it is, and in a case where the determination is positive, the CPU proceeds to step S206.

In step S206, the CPU 14A performs setting change processing of a target device and ends the series of processes.

The setting change processing of the target device is processing of controlling the first image forming device 12A by using the acquired relevant information. The processing is to change the setting parameter as setting information that needs to be changed depending on the environment. Accordingly, even in the first image forming device 12A not including the device environment sensor 41, the setting corresponding to the environment is changed.

Here, a specific example of the setting change processing of the target device in step S206 described above performed by the device management server 14 will be described.

In a case where the device environment information detected by the device environment sensor 41 is acquired as the relevant information, the device management server 14 acquires the setting information of the second image forming device 12B that needs to be changed depending on the environment, and controls the first image forming device 12A by using the acquired setting information. For example, in a case where the setting information of the second image forming device 12B is changed based on the detection result of the device environment sensor 41, the device management server 14 acquires the changed setting information from the second image forming device 12B. The device management server 14 searches for a region where the second image forming device 12B for which the setting information is acquired is installed and the first image forming device 12A installed in a predetermined range from the second image forming device 12B. In a case where there is the first image forming device 12A installed in the region where the second image forming device 12B for which the setting information is acquired is installed, processing of changing the setting of the first image forming device 12A according to the setting information of the second image forming device 12B is performed.

In a case where the device environment information and the weather information are acquired as the relevant information, the device management server 14 controls the first image forming device 12A installed in a natural environment similar to the second image forming device 12B of which the setting needs to be changed depending on the environment. For example, in a case where the setting information of the second image forming device 12B is changed based on the detection result of the device environment sensor 41, the device management server 14 acquires the changed setting information from the second image forming device 12B. The device management server 14 searches for the first image forming device 12A installed in a region of weather information similar to the weather information (for example, humidity, temperature, and the like) in which the second image forming device 12B for which the setting information is acquired is installed. In a case where there is the first image forming device 12A installed in the region of the weather information similar to the weather information in which the second image forming device 12B for which the setting information is acquired is installed, processing of changing the setting of the first image forming device 12A to the setting content corresponding to the setting information of the second image forming device 12B is performed.

As the processing of changing the setting of the first image forming device according to the setting information of the second image forming device 12B, the setting parameter of the first image forming device 12A may be changed to be the setting parameter of the second image forming device 12B or may be changed to be the similar setting content.

In a case where the maintenance information is acquired as the relevant information and in a case where a predetermined setting regarding the environment is changed in the predetermined number or more of image forming devices 12 in a predetermined region, the device management server 14 controls the first image forming device 12A installed in the region. For example, in a case where similar settings are changed in the predetermined number or more of image forming devices 12 in the predetermined region from the maintenance information, processing of changing the setting of the first image forming device 12A installed in the region to the setting content corresponding to the changed setting is performed. Specifically, setting having usage performance with which setting depending on a certain environment is performed in a certain region by a predetermined number of times or more is changed to optimum setting including a usage method and a complex factor peculiar to the region in addition to an algorithm determined in advance by automatically adjusting the setting of the first image forming device 12A in an identical region.

In a case where the weather information is acquired as the relevant information, the device management server 14 controls a first device of which the setting needs to be changed depending on the natural environment. For example, the first image forming device 12A installed in a region where there is a possibility that a defect such as dew condensation occurs is searched from the weather information. In a case where there is the first image forming device 12A installed in the region where there is a possibility that the defect occurs, processing of changing the setting parameter of the first image forming device 12A to a setting parameter for preventing the defect such as dew condensation according to the weather is performed.

In a case where the maintenance information and the weather information are acquired as the relevant information, the device management server 14 performs processing of changing the setting parameter of the first image forming device 12A installed in the region of the weather information similar to the image forming device 12 of which the setting is changed by a maintenance worker according to the setting of the image forming device 12 changed by the maintenance worker. In the processing of changing the setting parameter of the first image forming device 12A according to the setting of the image forming device 12 changed by the maintenance worker, the setting parameter of the first image forming device 12A may be changed to be the changed setting parameter, or may be changed to the similar setting content.

In a case where the relevant information to be acquired includes the weather information, the setting parameter to be changed is determined from the weather information, and the setting of the first image forming device 12A may be changed to a setting parameter set in advance according to the weather information.

Figure 8:
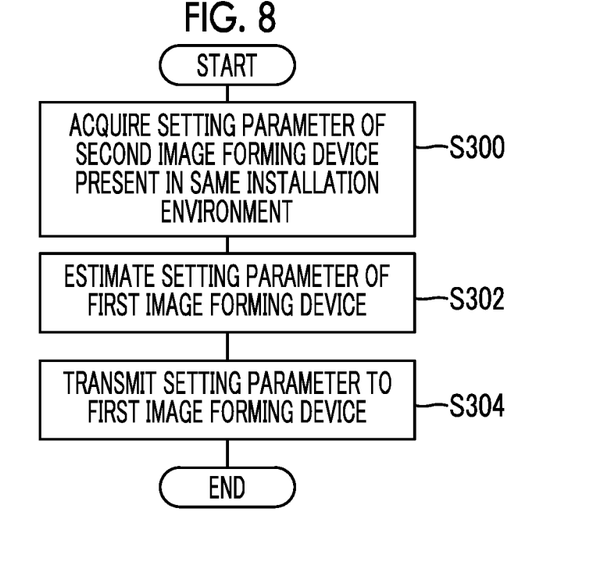
FIG. 8 is a flowchart showing an example of a flow of a setting change processing of a target device in a case where device environment information is acquired as relevant information.

Subsequently, a specific processing example of the setting change processing of the target device in step S206 described above in a case where the device environment information is acquired as the relevant information will be described. FIG. 8 is a flowchart showing an example of a flow of the setting change processing of the target device in a case where the device environment information is acquired as the relevant information.

Figure 9:
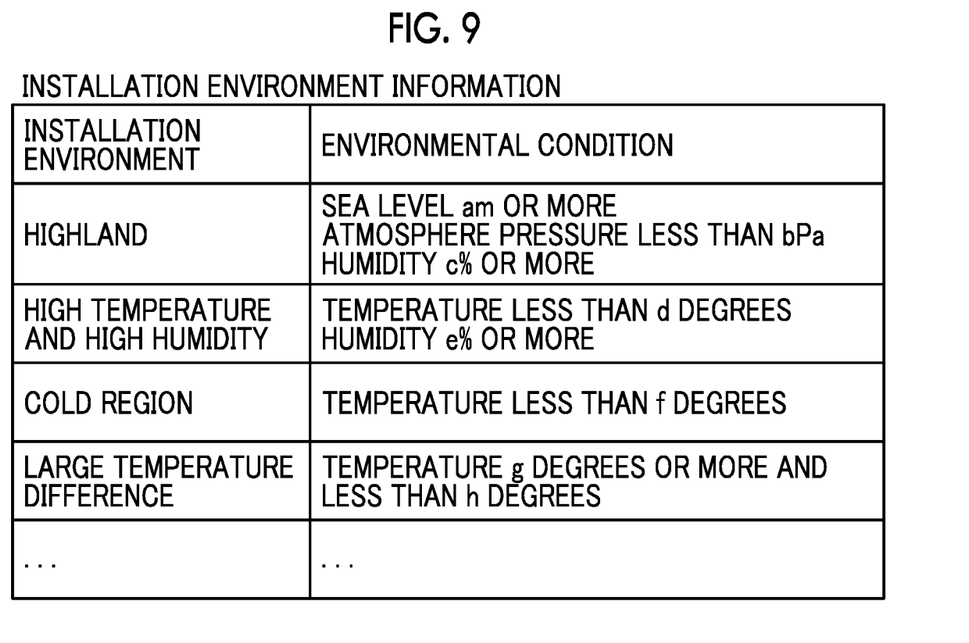
FIG. 9 is a diagram showing an example of installation environment information.
Figure 10:
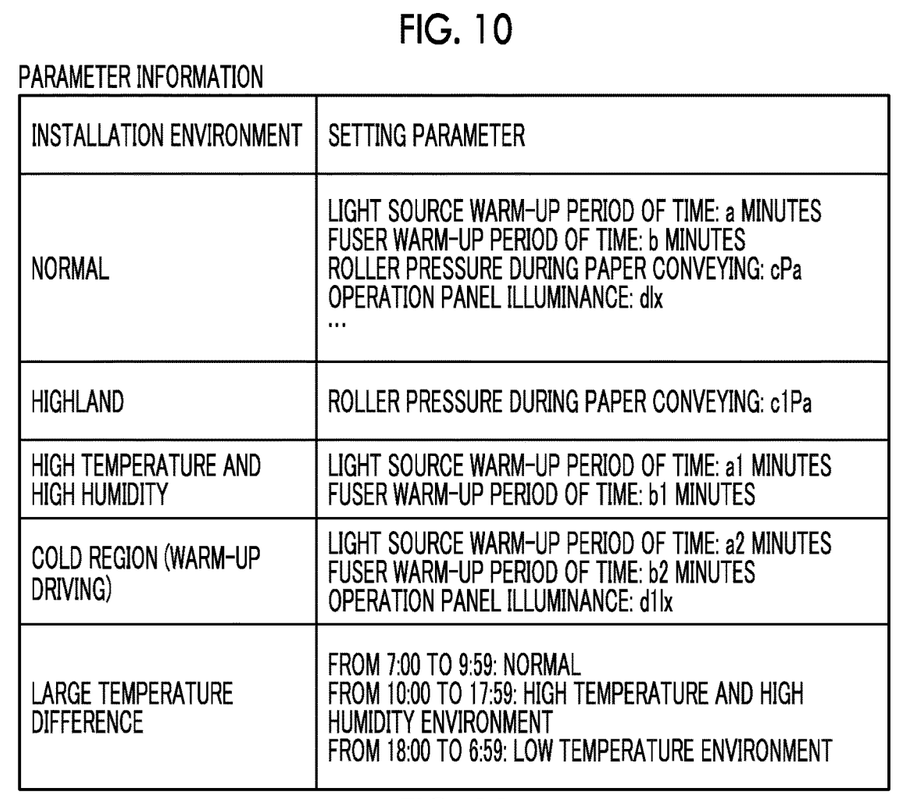
FIG. 10 is a diagram showing an example of parameter information in which an installation environment and a parameter value set in an image forming device 12 installed in the installation environment are associated with each other.

In step S300, the CPU 14A acquires the setting parameter of the second image forming device 12B in the same installation environment, and proceeds to step S302. For example, the installation environments of the image forming devices 12 are classified in advance, and are registered in the device management server 14 in advance by using the installation environment information shown in FIG. 9. Thus, the second image forming devices 12B present in the same environment may be specified to acquire the setting parameters. Alternatively, the image forming devices 12 in the same environment may be specified from the operation history information and the setting parameters of the image forming devices 12, and the setting parameters may be acquired. In the installation environment information of FIG. 9, an installation environment having an environmental condition in which a sea level is am or more, an atmospheric pressure is less than bPa, and humidity is c % or more is classified as a highland. An installation environment having an environmental condition in which a temperature is less than d degrees and humidity is e % or more is classified as high temperature and high humidity. An installation environment having an environmental condition in which a temperature is less than f degrees is classified as a cold region. An installation environment having an environmental condition in which a temperature is g degrees or more and is less than h degrees is classified as a large temperature difference. For example, a setting parameter according to the parameter information associated with the installation environment shown in FIG. 10 and the parameter value set in the image forming device 12 installed in the installation environment is set in the second image forming device 12B of each installation environment. In the parameter information shown in FIG. 10, as setting parameters in a case where the installation environment is normal, a light source warm-up period of time is a minutes, a fuser warm-up period of time is b minutes, a roller pressure during paper conveying is cPa, and an operation panel illuminance is dlx. As a setting parameter in a case where the installation environment is highland, the roller pressure during paper conveying is c1Pa. As setting parameters in a case where the installation environment is high temperature and high humidity, a light source warm-up period of time is a2 minutes, a fuser warm-up period of time is b2 minutes, and an operation panel illuminance is dl1x. As setting parameters in a case where the installation environment is a large temperature difference, a normal installation environment is at 7:00, a high temperature and high humidity environment is from 10:00 to 17:59, and a low temperature environment is from 18:00 to 6:59.

In step S302, the CPU 14A estimates the setting parameter of the first image forming device 12A, and proceeds to step S304. For example, the parameter value set in the first image forming device 12A is estimated from the setting parameter of the second image forming device 12B in the same installation environment. In a case where there is a difference in the configurations of the first image forming device 12A and the second image forming device 12B, the parameter value is estimated by adjusting each parameter by using a conversion coefficient or the like.

Figure 11:
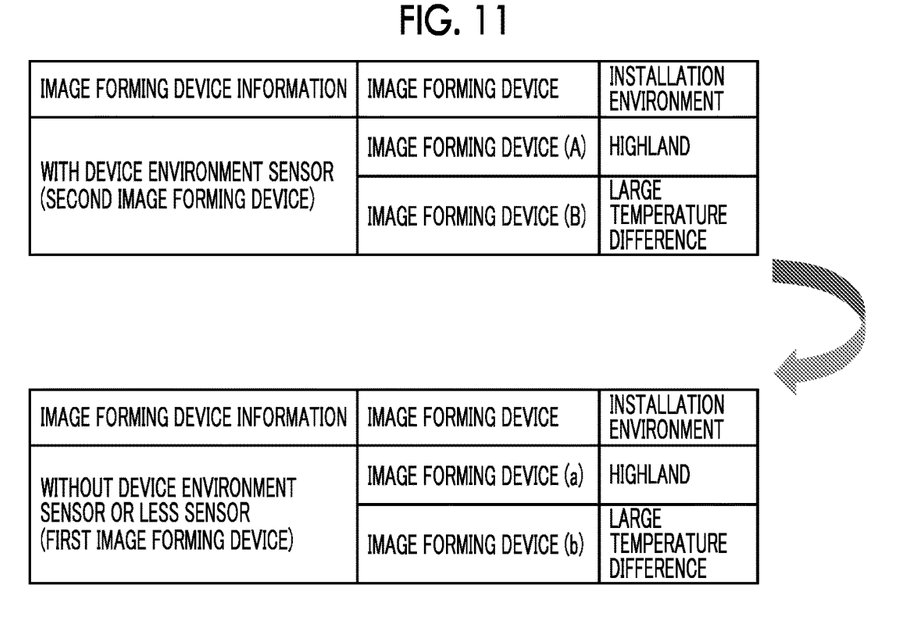
FIG. 11 is a diagram illustrating setting change of a first image forming device.

In step S304, the CPU 14A changes the setting of the first image forming device 12A by transmitting the setting parameter to the first image forming device 12A, and ends the series of processing. For example, as shown in FIG. 11, a parameter related to a state detected by an image forming device (A) is reflected to an image forming device (a) of the first image forming device 12A which has the same installation environment as the image forming device (A) of the second image forming device 12B. In a case where there is a difference in the configurations of the image forming devices, a parameter obtained by adjusting each parameter such as a conversion coefficient is used.

Figure 12:
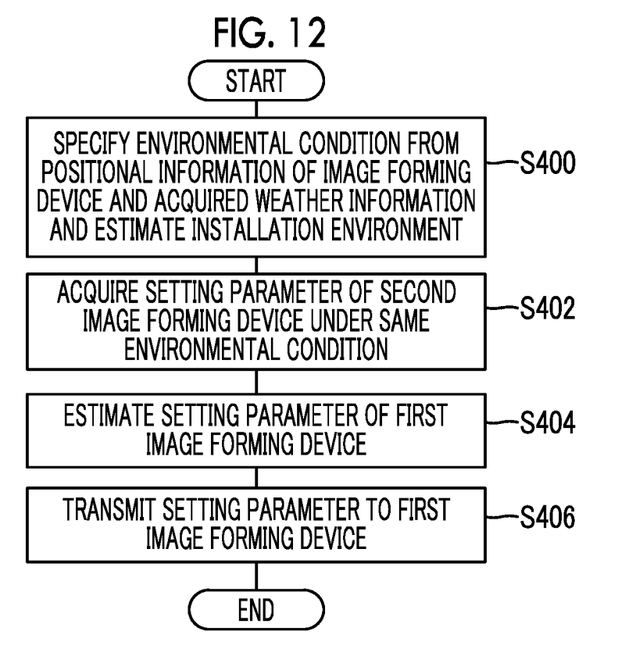
FIG. 12 is a flowchart showing an example of a flow of setting change processing of a target device in a case where device environment information and weather information are acquired as relevant information.

Next, a specific processing example of the setting change processing of the target device in step S206 described above in a case where the device environment information and the weather information are acquired as the relevant information will be described. FIG. 12 is a flowchart showing an example of a flow of the setting change processing of the target device in a case where the device environment information and the weather information are acquired as the relevant information.

Figure 13:
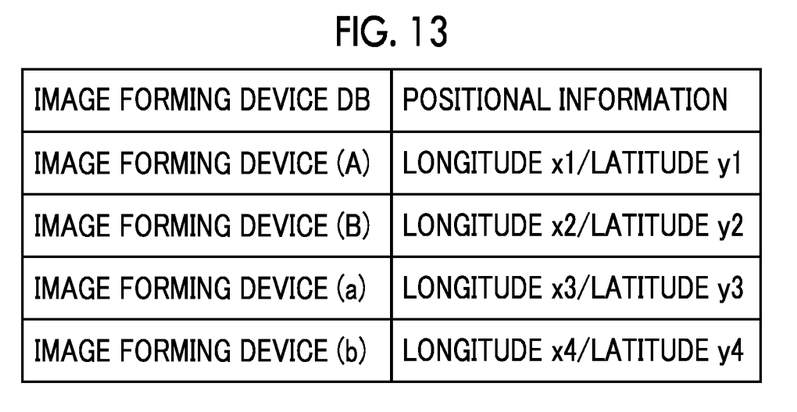
FIG. 13 is a diagram showing an example of positional information for each image forming device registered as a DB.

In step S400, the CPU 14A specifies the environmental condition from positional information of the first image forming device 12A and the acquired weather information, and estimates the installation environment. For example, as shown in FIG. 13, the positional information of each image forming device 12 is registered in advance in the device management server 14 as an image forming device database (DB), and the installation environment is estimated by specifying which of the installation environment corresponds to the installation environment in the installation environment information shown in FIG. 9 from the positional information of the first image forming device 12A and the weather information.

In step S402, the CPU 14A acquires the setting parameter of the second image forming device 12B under the same environmental condition, and proceeds to step S404.

In step S404, the CPU 14A estimates the setting parameter of the first image forming device 12A, and proceeds to step S406. For example, the parameter value set in the first image forming device 12A is estimated from the setting parameter of the second image forming device 12B in the same installation environment. In a case where there is a difference in the configurations of the first image forming device 12A and the second image forming device 12B, the parameter value is estimated by adjusting each parameter by using a conversion coefficient or the like.

In step S406, the CPU 14A changes the setting of the first image forming device 12A by transmitting the setting parameter to the first image forming device 12A, and ends the series of processing. For example, as shown in FIG. 11, a parameter related to a state detected by an image forming device (A) is reflected to an image forming device (a) of the first image forming device 12A which has the same installation environment as the image forming device (A) of the second image forming device 12B. In a case where there is a difference in the configurations of the image forming devices, a parameter obtained by adjusting each parameter such as a conversion coefficient is used.

Figure 14:
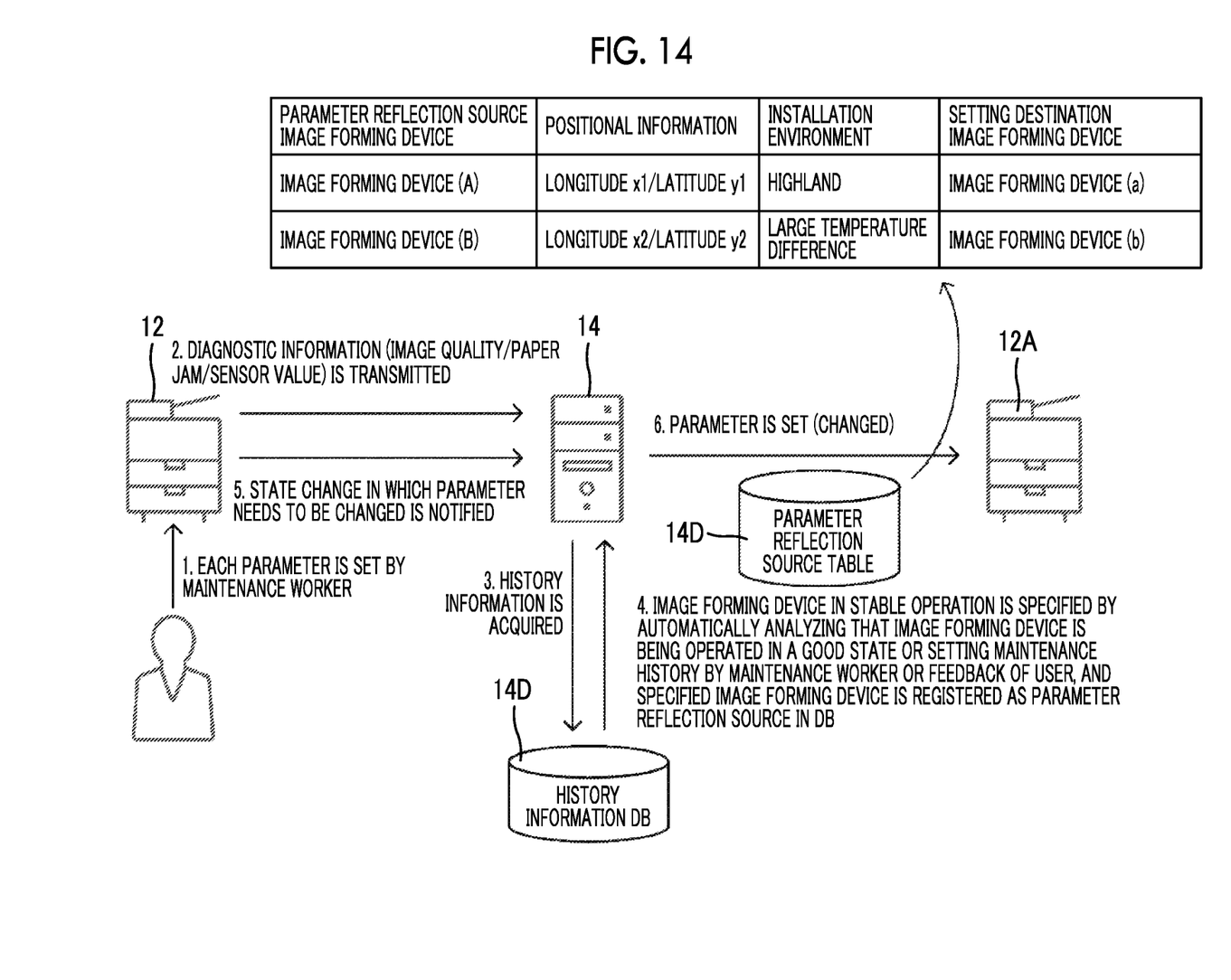
FIG. 14 is a schematic diagram showing a specific example in a case where the device management server of the information processing system according to the present exemplary embodiment controls a first image forming device 12A by using maintenance information.

Next, a specific example in which, in a case where the maintenance information is acquired as the relevant information and in a case where a predetermined setting regarding the environment is changed in the predetermined number or more of image forming devices 12 in a predetermined region, the device management server 14 controls the first image forming device 12A installed in the region will be described. FIG. 14 is a schematic diagram showing a specific example in a case where the device management server 14 of the information processing system 10 according to the present exemplary embodiment controls the first image forming device 12A by using maintenance information.

In a case where the first image forming device 12A is controlled by using the maintenance information, as an example, processing is performed according to 1. to 6. shown in FIG. 14.

In 1., the maintenance worker sets the parameters of the image forming devices 12 including the first image forming device 12A and the second image forming device 12B.

In 2., each image forming device 12 transmits diagnostic information (for example, image quality, paper jam, sensor value, and the like) to the device management server 14. The diagnostic information may be transmitted, for example, periodically or when a state changes.

In 3., the device management server 14 retains history information such as a history of diagnostic information, a maintenance history, an analysis result of an operating state, and feedback from a user in the HDD 14D as a history information DB.

In 4., in the device management server 14, the image forming device 12 in stable operation is specified by automatically analyzing that the image forming device is operating in a good state or by setting the maintenance history by the maintenance worker or the feedback of the user, and is registered in the DB. Specifically, an image forming device in stable operation is specified from among the image forming devices 12 in which the predetermined setting regarding the environment by the maintenance worker is performed in the predetermined region by the predetermined number of times or more, and the specified image forming device is registered in the DB as a parameter reflection source image forming device.

In 5, the second image forming device 12B notifies the device management server 14 of the state change in which the parameter needs to be changed.

In 6, the device management server 14 sets the parameter of the first image forming device 12A. That is, in a case where the predetermined setting regarding the environment by the maintenance worker is performed in the predetermined region by the predetermined number of times or more, the device management server 14 performs the parameter setting of the first image forming device 12A in the identical region as the second image forming device 12B as a notification source of a state change in which the parameter needs to be changed. For example, as shown in FIG. 14, the setting of an image forming device (a) which is a setting destination image forming device in which positional information is longitude x1/latitude y1 and an installation environment is a highland and which is in the identical region as a parameter change source image forming device (A) is changed according to the image forming device (A). The setting of an image forming device (b) which is a setting destination image forming device in which positional information is longitude x2/latitude y2 and an installation environment is a large temperature difference and which is in the identical region as a parameter change source image forming device (B) is changed according to the image forming device (B).

In the above exemplary embodiment, although the example in which the device management server 14 acquires the weather information from the weather service 21 has been described, natural environment information other than the weather information may be acquired. For example, a detection result of a temperature sensor, a humidity sensor, and the like installed in each region may be acquired as the natural environment information.

In the present exemplary embodiment, although the example in which the setting parameter of the first image forming device 12A is changed has been described as the processing of controlling the first image forming device 12A, the present invention is not limited thereto, and other processing may be performed. For example, in a case where the air conditioner 19 can be controlled, the installation environment of the first image forming device 12A is controlled by changing the activation of the air conditioner 19, the temperature setting, and the like, and thus, the first image forming device 12A may be controlled. Both the setting change of the first image forming device 12A and the control of the air conditioner 19 may be performed.

In the above exemplary embodiment, although at least one information of the device-relevant information, the maintenance information, or the weather information has been described as an example of the relevant information, the relevant information is not limited thereto. For example, prediction information predicted from past defect information of the image forming device 12 may be applied.

In the above exemplary embodiment, although the example in which the second image forming device 12B including the device environment sensor 41 and the first image forming device 12A not including the device environment sensor 41 are present has been described, the present invention is limited thereto. For example, in the above exemplary embodiment, in a case where the device environment information is not used as the relevant information, a system in which the second image forming device 12B is not present may be used.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The processing performed in each part of the information processing system 10 according to the above exemplary embodiment may be processing performed by software, processing performed by hardware, or processing in which both the software and the hardware are combined. The processing performed in each part of the information processing system 10 may be stored in a storage medium as a program and distributed.

The present invention is not limited to the above description, and it is needless to say that the present invention can be variously modified and implemented within a range not deviating from the gist thereof.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory configured to store positional information and history information for each of a plurality of devices; and
a processor configured to perform a process including:
searching for a first device of which a setting parameter needs to be changed depending on an environment from a second device other than the first device according to the positional information, the first device not being capable of detecting predetermined device environment information;
acquiring relevant information related to setting of the first device; and
controlling the first device by using the acquired relevant information,
wherein in a case where setting information of the second device is acquired as the relevant information, the processor acquires a setting parameter of the second device, converts the setting parameter of the second device to a converted setting parameter according to history information of the first device and the second device, and controls the first device to adjust the setting parameter to the converted setting parameter.

2. The information processing apparatus according to claim 1, wherein the processor is configured to:
acquire, as the relevant information, at least one information of predetermined maintenance information related to the device environment information, the device environment information detected by the second device capable of detecting the device environment information, or natural environment information indicating a natural environment of a region in which a device is installed.

3. The information processing apparatus according to claim 2, wherein the processor is configured to:
control the first device by using setting information that needs to be changed depending on an environment of the second device in a case where the device environment information is acquired as the relevant information.

4. The information processing apparatus according to claim 3, wherein the processor is configured to:
change the setting of the first device by reflecting the setting information of the second device of which the setting is changed depending on the environment or change the setting of the first device to a setting content similar to the setting information of the second device of which the setting is changed depending on the environment.

5. The information processing apparatus according to claim 3, wherein the processing of controlling the first device is at least one processing of processing of changing the setting of the first device or processing of controlling air-conditioning of a space in which the first device is installed.

6. The information processing apparatus according to claim 2, wherein the processor is configured to:
control the first device installed in a natural environment similar to the second device of which setting is changed depending on an environment in a case where the device environment information and the natural environment information are acquired as the relevant information.

7. The information processing apparatus according to claim 6, wherein the processor is configured to:
control the first device by using the setting information of the second device of which the setting is changed depending on the environment.

8. The information processing apparatus according to claim 7, wherein the processor is configured to:
change the setting of the first device by reflecting the setting information of the second device of which the setting is changed depending on the environment or change the setting of the first device to a setting content similar to the setting information of the second device of which the setting is changed depending on the environment.

9. The information processing apparatus according to claim 6, wherein the processor is configured to:
determine the setting parameter from the natural environment information and change the setting of the first device according to the natural environment information.

10. The information processing apparatus according to claim 6, wherein the processor is configured to:
acquire the natural environment information from weather information.

11. The information processing apparatus according to claim 2, wherein the processor is configured to:
control the first device in a predetermined region in a case where the maintenance information is acquired as the relevant information and setting is changed in a predetermined number or more of devices in the region.

12. The information processing apparatus according to claim 2, wherein the processor is configured to:
control the first device of which setting needs to be changed depending on the natural environment in a case where the natural environment information is acquired as the relevant information.

13. The information processing apparatus according to claim 12, wherein the processor is configured to:
acquire the natural environment information from weather information.

14. The information processing apparatus according to claim 2, wherein the processor is configured to:
control the first device set in an environment similar to a device of which setting is changed in a case where the maintenance information and the natural environment information are acquired as the relevant information.

15. The information processing apparatus according to claim 2, wherein the processing of controlling the first device is at least one processing of processing of changing the setting of the first device or processing of controlling air-conditioning of a space in which the first device is installed.

16. The information processing apparatus according to claim 1, wherein the processing of controlling the first device is at least one processing of processing of changing the setting of the first device or processing of controlling air-conditioning of a space in which the first device is installed.

17. An information processing system comprising:
a first device; and
an information processing apparatus that includes a memory and a processor,
wherein the memory stores positional information and history information for each of a plurality of devices, and
wherein the processor searches for the first device of which a setting parameter needs to be changed depending on an environment from a second device other than the first device according to the positional information, the first device not being capable of detecting predetermined device environment information, acquires relevant information related to setting of the first device, and controls the first device by using the acquired relevant information,
wherein in a case where setting information of the second device is acquired as the relevant information, the processor acquires a setting parameter of the second device, converts the setting parameter of the second device to a converted setting parameter according to history information of the first device and the second device, and controls the first device to adjust the setting parameter to the converted setting parameter.

18. The information processing system according to claim 17, further comprising:
the second device that is capable of detecting the device environment information as the device other than the first device.

19. A non-transitory computer readable medium storing an information processing program causing a computer to execute a process comprising:
storing positional information and history information for each of a plurality of devices in a memory;
searching for a first device of which a setting parameter needs to be changed depending on an environment from a second device other than the first device according to the positional information, the first device not being capable of detecting predetermined device environment information;
acquiring relevant information related to setting of the first device; and
controlling the first device by using the acquired relevant information,
wherein in a case where the relevant information is setting information of the second device, a setting parameter of the second device is acquired and converted to a converted setting parameter according to history information of the first device and the second device, and the first device is controlled to adjust the setting parameter to the converted setting parameter.

* * * * *